United States Patent [19]

Cuillerdier et al.

[11] Patent Number: 5,223,232
[45] Date of Patent: Jun. 29, 1993

[54] PROCESS FOR SEPARATING IRON AND/OR ZIRCONIUM FROM THE ACTINIDES AND/OR LANTHANIDES PRESENT IN AN AQUEOUS ACID SOLUTION BY MEANS OF A PROPANE DIAMIDE

[75] Inventors: Christine Cuillerdier, Paris; Pierre Hoel, Palaiseau; Claude Musikas, Bures sur Yvett; Laurence Nigond, Fontenay awe Roses, all of France

[73] Assignee: Commissariat a l'Energie Atomique, Paris, France

[21] Appl. No.: 848,256

[22] Filed: Mar. 9, 1992

[30] Foreign Application Priority Data

Mar. 21, 1991 [FR] France .................. 91 03453

[51] Int. Cl.$^5$ ............................................. B01D 11/04
[52] U.S. Cl. ...................................... 423/9; 423/21.5; 423/139; 423/70; 210/634
[58] Field of Search .................... 423/9, 21.5, 139, 70; 534/12, 15; 564/160; 210/634

[56] References Cited

U.S. PATENT DOCUMENTS

| | | | |
|---|---|---|---|
| 4,548,790 | 10/1985 | Horwitz et al. | 423/9 |
| 4,572,802 | 2/1986 | Hubert et al. | 534/12 |
| 4,770,807 | 9/1988 | Musikas et al. | 252/184 |
| 4,772,429 | 9/1988 | Descouls et al. | 252/625 |
| 4,938,871 | 7/1990 | Musikas et al. | 210/634 |

FOREIGN PATENT DOCUMENTS

| | | |
|---|---|---|
| 0110789 | 6/1984 | European Pat. Off. |
| 0210928 | 2/1987 | European Pat. Off. |
| 0228940 | 7/1987 | European Pat. Off. |
| 0381579 | 8/1990 | European Pat. Off. |

OTHER PUBLICATIONS

Metadex, No. 90 (7):42–744 Solvent Extr. Ion Exch. (1989) 7, (5), pp. 813–827, Thiollet et al.: "Synthesis and uses of Amides Extractants".

Metadex, No. 89 (3):42–331, Sep. Sci. Technol. (1988) 23, (12–13), pp. 1211–1226, Musikas: "Potentiality of Nonorganophosphorus Extract. in Chem. Sep. of Actinides".

Primary Examiner—Donald P. Walsh
Assistant Examiner—Ngoclan T. Mai
Attorney, Agent, or Firm—Pearne, Gordon, McCoy & Granger

[57] ABSTRACT

The invention relates to a process for separating iron and/or zirconium from the actinides and/or lanthanides present in an aqueous acid solution by means of a propane diamide.

According to the invention, use is made of a pentasubstituted propane diamide of formula:

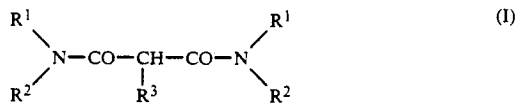

in which $R^1$, $R^2$ and $R^3$, which can be the same or different, are alkyl radicals, which can have 1 or 2 oxygen atoms in their chain.

To maintain the iron in aqueous solution, a choice is made of an appropriate propane diamide of formula (I) with $R^3$ representing a $C_{12}$ to $C_{25}$ alkyl in order to have different extraction kinetics between Fe and the actinides or lanthanides, or an additive is added to the aqueous solution, e.g. oxalic acid or sodium nitrate.

15 Claims, No Drawings

PROCESS FOR SEPARATING IRON AND/OR ZIRCONIUM FROM THE ACTINIDES AND/OR LANTHANIDES PRESENT IN AN AQUEOUS ACID SOLUTION BY MEANS OF A PROPANE DIAMIDE

The present invention relates to a process for separating iron and/or zirconium from actinides and/or lanthanides present in an acid aqueous solution such as a nitric solution more particularly coming from an irradiated nuclear fuel reprocessing plant.

In irradiated nuclear fuel reprocessing plants, in the first uranium and plutonium extraction stage, aqueous solutions of fission products are normally obtained, which contain relatively large quantities of trivalent ions from the series of lanthanides and actinides and fission or corrosion products such as iron and zirconium. The aqueous effluents from these plants also contain the same ions.

In view of the relatively long half-life of trivalent actinides and lanthanides, it is of great interest to separate them from the aqueous solutions in order to avoid the manipulation or handling of waste or effluents having a high alpha activity. However, it is not advantageous to extract at the same time as these trivalent ions, the fission or corrosion products such as iron and zirconium, which are much less prejudicial, because they are not alpha emitters.

Hitherto, separation has taken place of the trivalent actinides and lanthanides present in aqueous solutions using organic extractants, e.g. chelating bifunctional compounds such as octyl phenyl-N,N-diisobutyl carbamoyl methyl phosphine oxide and dihexyl diethyl carbamoyl methylene phosphonate, as described by G. F. Vandegrift et al in ANL 84-45 (1984) and by R. A. Leonard et al in ANL 85-45 (1985).

These extractants are efficient for separating trivalent actinides, but suffer from a certain number of disadvantages. Thus, it is not possible to completely incinerate them due to the presence of phosphorus. Under the action of hydrolysis and radiolysis they produce disturbing compounds liable to give precipitates or create actinide retentions on deextraction. They are also expensive and difficult to purify.

For separating the actinides and lanthanides present in aqueous solutions, it is also possible to use substituted propane diamides, such as are described in EP-A-110 789 and EP-A-210 928.

These propane diamides, which are bifunctional extractants, permit the extraction of trivalent actinides and lanthanides in a nitric medium. They do not contain phosphorus and can consequently be completely incinerated, which avoids the production of other waste. Their radiolytic or hydrolytic degradation products are not prejudicial, because they do not create precipitates or actinide retention. Nevertheless, they also extract metals such as iron and zirconium, which it would be advantageous to leave in aqueous solution during the extraction of the trivalent lanthanides and actinides.

The present invention specifically relates to a process for the separation of trivalent lanthanides and actinides by means of propane diamides, which makes it possible to separate these actinides and lanthanides from the fission or corrosion products such as iron and zirconium present in an aqueous acid solution.

According to the invention, use is made for said separation of pentasubstituted propane diamides in accordance with the formula:

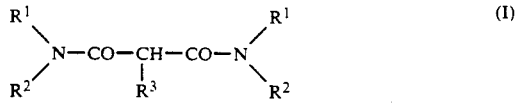

in which $R^1$, $R^2$ and $R^3$, which can be the same or different, are straight or branched alkyl radicals with 1 to 25 carbon atoms optionally having 1 to 2 oxygen atoms in their chain.

In order to separate iron and possibly zirconium from the actinides and/or lanthanides, it is possible to either use the extraction kinetic difference of iron compared with the trivalent lanthanides and actinides by choosing an appropriate propane diamide, or add to the starting aqueous solutions a compound making it possible to prevent the extraction of iron and/or zirconium, e.g. oxalic acid or a nitrate with the exception of lithium nitrate.

In addition, according to a first embodiment, the process of the invention for separating iron from the trivalent lanthanides and/or actinides present in an aqueous acid solution comprises:

a) contacting the aqueous acid solution with an organic solvent containing as the extractant a propane diamide of formula:

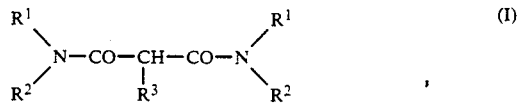

in which $R^1$ and $R^2$, which can be the same or different, represent a straight or branched alkyl radical with 1 to 25 carbon atoms or a radical of formula:

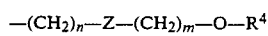

$$-(CH_2)_n-Z-(CH_2)_m-O-R^4$$

in which $R^4$ is an alkyl radical with 1 to 13 carbon atoms, n is equal to 0 or an integer from 1 to 6, Z is a single bond or an oxygen atom and m is an integer from 1 to 6, provided that Z is a single bond when n is equal to 0, and $R^3$ represents an alkyl radical with 12 to 25 carbon atoms, for between 15 seconds and 5 minutes and b) separating the organic solvent having extracted the actinides and/or lanthanides from the aqueous solution containing the iron.

In this first embodiment of the process according to the invention, a choice is made of a pentasubstituted propane diamide of formula (I) in which $R^3$ is an alkyl radical having 12 to 25 carbon atoms in order to obtain an extraction kinetics difference between the actinides and/or lanthanides on the one hand and the iron on the other and in this way to bring about the separation of the iron and the trivalent lanthanides and/or actinides.

It has been found that with such propane diamides, the extraction speed of the actinides and lanthanides is very high, because the equilibrium is virtually reached at the end of 15 seconds, whereas the iron extraction speed is slower, equilibrium being reached after between 5 and 30 minutes or more, as a function of the acidity of the starting aqueous solution, because the iron extraction speed decreases when the acidity of the aqueous solution increases. Moreover, in order to ensure said separation, when the aqueous solution is a nitric solution, the nitric acid concentration of said solution is preferably adjusted to between 2 and 5 mole/l.

With such propane diamides, it has also been observed that the iron extraction speed decreases when the diamide concentration of the organic solvent increases. It is advantageous to use a solvent having a propane diamide concentration of 0.1 to 2 mole/l.

On using a propane diamide of formula (I) with $R^3$ representing an alkyl radical having 1 or 2 oxygen atoms in its chain, the iron extraction speed would also be slow, but the extraction speed difference between the iron and the actinides and lanthanides would be too small to be usable with a view to ensuring the separation between the iron and the trivalent actinides and/or lanthanides.

This first embodiment of the process according to the invention is very advantageous, because it makes it possible to carry out the separation of the actinides and lanthanides by simply varying the contact time and without any addition of products which might prove prejudicial.

However, according to the invention, it is also possible to separate the corrosion products such as iron and zirconium from the trivalent lanthanides and/or actinides by adding products which are not prejudicial.

In addition, according to a second embodiment, the process according to the invention for separating the iron and/or zirconium from the trivalent lanthanides and/or actinides present in an aqueous acid solution comprises a) adding oxalic acid to the aqueous solution, b) contacting the aqueous acid solution containing the oxalic acid with an organic solvent containing as the extractant a propane diamide of formula:

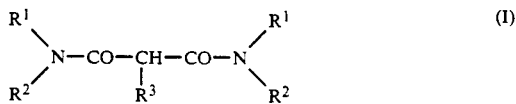

in which $R^1$ and $R^2$, which can be the same or different, represent a straight or branched alkyl radical with 1 to 25 carbon atoms, or a radical of formula:

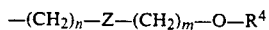

in which $R^4$ is an alkyl radical with 1 to 13 carbon atoms, n is equal to 0 or is an integer from 1 to 6, Z is a single bond or a hydrogen atom and m is an integer from 1 to 6, provided that Z is a single bond when n is equal to 0 and $R^3$ represents an alkyl radical with 12 to 25 carbon atoms, or a radical of formula:

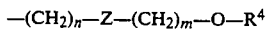

in which n, m, Z and $R^4$ have the meanings given hereinbefore, and c) separating the organic solvent which extracted the actinides and/or lanthanides from the aqueous solution containing the iron and/or zirconium.

In this second embodiment of the process according to the invention, advantage is taken of the complexing power of the oxalic acid in order to bring about an easy separation of the actinides and lanthanides from the iron and/or zirconium.

By appropriately choosing the oxalic acid concentrations and the acidity of the aqueous solution, as well as the extraction conditions, particularly the volumes of aqueous solution and organic solvent contacted, it is possible to obtain an effective separation between the actinides and/or lanthanides on the one hand and the iron and/or zirconium on the other.

Advantageously, the oxalic acid quantity added to the aqueous acid solution is such that the oxalic acid concentration of the aqueous solution is 0.05 to 0.5 mole/l. Preferably, when the aqueous solution is a nitric solution, its nitric acid concentration is 2 to 4 mole/l.

As an example of a propane diamide usable in this second embodiment of the process according to the invention, reference can be made to propane diamides of formula (I), in which $R^1$ represents $CH_3$, $R^2$ represents $C_4H_9$ and $R^3$ represents $C_2H_4OC_6H_{13}$ or $C_2H_4OC_2H_4OC_6H_{13}$.

According to a third embodiment of the process according to the invention for separating iron from the trivalent lanthanides and/or actinides present in an aqueous acid solution comprises:

a) adding to the aqueous acid solution a nitrate of formula $(NO_3)_v M$, in which M is $NH_4$ or a metal, except Li and v is the valency of said metal, b) contacting the thus treated aqueous acid solution with an organic solvent containing as the extractant a propane diamide of formula:

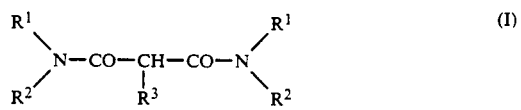

in which $R^1$ and $R^2$, which can be the same or different, represent a straight or branched alkyl radical with 1 to 25 carbon atoms or a radical of formula:

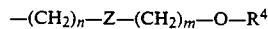

in which $R^4$ is an alkyl radical with 1 to 13 carbon atoms, n is equal to 0 or an integer from 1 to 6, Z is a single bond or an oxygen atom and m is an integer from 1 to 6, provided that Z is a single bond when n is equal to 0, and $R^3$ represents an alkyl radical having 12 to 25 carbon atoms, or a radical of formula:

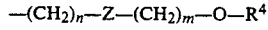

in which n, m, Z and $R^4$ have the meanings given hereinbefore, and c) separating the organic solvent which has extracted the actinides and/or lanthanides from the aqueous solution containing the iron.

In this third embodiment of the process according to the invention, advantage is taken of the fact that nitrate addition in high concentration produces a salting out effect on the actinides and lanthanides and therefore an increase in the extraction coefficients, whereas this effect does not occur with iron. However, to take advantage of this effect, it is necessary that the iron is not rapidly extracted from the aqueous solution. However, it is known that iron and lanthanides are strongly extracted in a concentrated acid medium, whereas they are weakly extracted in a dilute acid medium.

In addition, in this third embodiment of the invention, the acidity must be low. Thus, in the case of nitric aqueous solutions, the nitric acid concentration of the aqueous solution is preferably below 0.1 mole/l.

However, the nitrate concentration must be sufficiently high to obtain the salting out effect of the nitrate on the actinides and lanthanides. Advantageously, the nitrate concentration, i.e. in $NO_3^-$ of the compound $(NO_3)_nM$ is at least 6 mole/l.

The propane diamides used in the three embodiments of the process according to the invention can be prepared by conventional processes, particularly those described in FR-A-2 585 700.

Thus, it is possible to prepare them from tetrasubstituted propane diamides of formula:

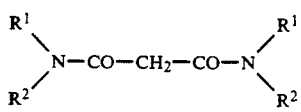

by reaction with n-butyl lithium followed by a condensation with a halide of formula $R^3X$, in which X represents a halogen atom.

The halides of formula $R^3X$ are preferably bromides or iodides and they can be prepared when $R^3$ incorporates an ether-oxide group by using the process described by F. C. Cooper and M. W. Partridge in J. Chem. Soc., (1950), p.459.

The tetrasubstituted propane diamides used as starting products can be prepared by amination of malonyl chloride by means of the corresponding amines of formula:

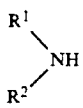

in which $R^1$ and $R^2$ have the meanings given hereinbefore.

The amines $HNR^1R^2$ can be prepared by conventional processes, particularly that described by J. L. Nelson and R. C. Sentz in J. Amer. Chem. Soc., vol.74, p.1704, (1952).

When the above-mentioned processes are used for preparing the propane diamides used in the invention, the propane diamide obtained is constituted by a mixture of isomers. According to the invention, it is possible to use as the extractant, one of these isomers or a mixture thereof, and it is pointed out that the formulas given here can either represent one of the isomers or the isomer mixture.

According to the invention, the organic solvent used for the extraction is generally constituted by an organic diluent containing in solution the propane diamide of formula (I). The propane diamide concentration of the solvent can be e.g. from 0.1 to 2 mole/l.

However, although the extraction level of the actinides and lanthanides increases with the propane diamide concentration of the organic solvent, it is preferable to use propane diamide concentrations in the organic solvent which do not exceed 1 mole/l in order to obtain a good separation of the iron and/or optionally other corrosion products. The organic diluents which can be used are inert organic diluents preferably having a not very high dielectric constant.

Examples of such diluents are aromatic diluents such as benzene, xylene, mesitylene, tert. butyl benzene, aliphatic diluents such as dodecane, hydrogenated tetrapropylene, cyclic diluents such as decalin and chlorinated diluents such as tetrachloroethylene.

Thus, the propane diamides according to the invention are more interesting to use than the propane diamides of EP-A- 210 928, because they can be used not only with aromatic diluents, but also with aliphatic, cyclic and chlorinated diluents. Moreover, they do not give rise to the formation of a third phase in the presence of concentrated nitric solutions.

The process according to the invention can be performed in any conventional extraction apparatus, such as mixer-settler groups, exchange columns, e.g. pulsed columns, centrifugal extractors, etc. Normally working takes place at ambient temperature and pressure with aqueous solution/organic solvent volume ratios between 0.1 and 10.

The actinides and lanthanides extracted in the organic solvent can then be recovered with very good yields by reextraction in water.

The aqueous starting solutions are acid solutions, e.g. hydrochloric solutions and preferably nitric solutions.

Other features and advantages of the invention can be gathered from reading the following examples given in an illustrative and non-limitative manner.

EXAMPLE 1

Preparation of
2-tetradecyl-N,N'-dimethyl-N,N'-dibutyl-propane diamide (compound 1)

Into a 1 liter reactor, scavenged by an argon stream, is introduced 0.1 mole of N,N'-dimethyl-N,N'-dibutyl-propane diamide dissolved in 400 ml of tetrahydrofuran. Cooling takes place to −50° C. with the aid of an acetone and solid carbon dioxide bath and a N-butyl lithium solution prepared from 0.1 mole of N-butyl lithium is poured into 100 ml of anhydrous tetrahydrofuran. Under the same conditions, pouring takes place of a solution of tetradecyl iodide prepared from 0.1 mole of tetradecyl iodide and 100 ml of anhydrous tetrahydrofuran. When pouring is ended, the temperature is allowed to rise to ambient temperature, followed by refluxing the tetrahydrofuran for 3 hours. It is left to cool and then hydrolyzed with a water-ethanol mixture. The tetrahydrofuran is expelled and in this way a precipitate is formed. It is taken up with methylene chloride, washed with water, the organic layer is dried and then the solvent is expelled prior to distillation.

Its characterization by nuclear magnetic resonance of the proton and by potentiometric determination confirms that it corresponds to the formula given in the attached table 1.

EXAMPLE 2

Preparation of
2-ethoxydodecyl-N,N'-dimethyl-N,N'-dibutyl-propane diamide (compound 2)

The same operating procedure as in example 1 is followed for preparing compound 2 from N,N'-dimethyl-N,N'-dibutyl-propane diamide using 0.1 mole of ethoxydodecyl bromide in place of 0.1 mole of hexyl iodide.

This gives compound 2 complying with the formula given in table 1.

EXAMPLE 3

Preparation of
2-dodecyl-N,N'-dimethyl-N,N'-dibutyl-propane diamide (compound 3)

The same operating procedure as in example 1 is followed for preparing compound 3 from N,N'-dimethyl-N,N'-dibutyl-propane diamide using 0.1 mole of dodecyl iodide in place of 0.1 mole of hexyl iodide.

This gives compound 3 complying with the formula given in table 1.

EXAMPLE 4

Preparation of 2-ethoxyhexyl-N,N'-dimethyl-N,N'-dibutyl-propane diamide (compound 4)

The same operating procedure as in example 1 is followed for preparing compound 4 starting with N,N'-dimethyl-N,N'-dibutyl-propane diamide and using 0.1 mole of ethoxyhexyl bromide in place of 0.1 mole of tetradecyl iodide.

This gives compound 4 complying with the formula given in table 1.

EXAMPLE 5

Preparation of 2-ethoxy-ethoxyhexyl-N,N'-dimethyl-N,N'-dibutyl-propane diamide (compound 5)

The same operating procedure as in example 1 is followed, except that use is made of 0.1 mole of ethoxyethoxyhexyl bromide in place of 0.1 mole of tetradecyl iodide.

This gives compound 5 complying with the formula given in table 1.

EXAMPLE 6

Preparation of 2-hexadecyl-N,N'-tetramethyl-propane diamide (compound 6)

The same operating procedure as in example 1 is followed for preparing this compound from N,N'-tetramethyl-propane diamide using 0.1 mole of hexadecyl iodide in place of 0.1 mole of tetradecyl iodide.

This gives compound 6 complying with the formula given in table 1.

EXAMPLE 7

This example illustrates the use of 2-tetradecyl-N,N'-dimethyl-N,N'-dibutyl-propane diamide (compound 1) for separating iron from americium in accordance with the first embodiment of the process according to the invention.

In this example several tests are carried out by contacting one volume of an aqueous nitric solution having a nitric acid concentration of 2.5 mole/l including iron and americium traces with one volume of an organic solvent constituted by hydrogenated tetrapropylene (HTP) containing 0.5 mole/l of compound 1.

After contacting, accompanied by stirring, for between 15 s and 20 min at 25° C., separation takes place of the two phases and their respective americium and iron concentrations are measured. This is followed by the determination of the distribution coefficients $D_{Am}$ and $D_{Fe}$, which correspond to the ratio of the concentration of the element (Am or Fe) in the organic solvent to the concentration of said same element (Am or Fe) in the aqueous solution. Determination also takes place of the decontamination factor DF corresponding to the ratio $D_{Am}/D_{Fe}$. The results obtained are given in table 2.

These results show that americium is extracted very rapidly because, after 15 s stirring, equilibrium is quasi-reached. However, the extraction of iron is slower, because the equilibrium is only reached after 5 to 10 min.

EXAMPLE 8

This example also uses compound 1 for separating iron from americium on the basis of starting solutions containing iron and americium traces, whose nitric acidity is regulated to 4 mole/l. The organic solvent is constituted by HTP containing 0.5 mole/l of compound 1 and the procedure of example 7 is used contacting, accompanied by stirring, one volume of the organic solvent and one volume of the aqueous solution at 25° C. for between 15 s and 4 min. The results obtained are given in table 2.

EXAMPLE 9

The same operating procedure as in example 7 is used for separating iron from americium, but using a compound 1 concentration of 0.767 mole/l and by regulating the nitric acidity of the aqueous solution to 3 mole/l. The results obtained are given in table 2 for contact times between 0.25 min and 60 min.

On the basis of the results of examples 7 to 9, it can be seen that the effect of iron-americium separation increases with the organic extractant concentration and the nitric acid concentration of the starting aqueous solution and that it is possible to obtain high DF values by using contact times of 15 s to 5 min.

EXAMPLE 10

This example also uses compound 1 for separating americium from an aqueous starting solution containing iron and americium traces and having a nitric acid concentration of 2.5 mole/l. The organic solvent is constituted benzene containing 0.5 mole/l of compound 1.

For carrying out extraction, contacting takes place between one volume of the aqueous solution and one volume of the organic solvent, accompanied by stirring, for 0.5 min at 25° C. The two phases are then separated, their americium concentration measured and the distribution coefficient $D_{Am}$ determined. This gives $D_{Am} = 0.24$.

EXAMPLE 11

The operating procedure of example 10 is adopted for separating americium from the same aqueous solution, but using as the organic solvent benzene containing 0.5 mole/l of compound 6. Under these conditions $D_{Am}$ is 1.38.

Thus, on comparing these results with those of example 10, it can be seen that the lengthening of the hydrocarbon chain corresponding to $R^3$ in the compound of formula (1) of the invention makes it possible to obtain a better americium extraction.

EXAMPLES 12 TO 15

These examples use the second embodiment of the process according to the invention, namely the addition of oxalic acid for separating the iron from the americium present in an aqueous nitric solution with a nitric acid concentration of 3 mole/l and containing traces of $Am^{3+}$ and 0.05 to 0.2 mole/l of $Fe^{3+}$.

In this case the organic solvent is compound 4 in a concentration of 0.5 mole/l in t-butyl benzene and to the aqueous solution is added 0.213 or 0.5 mole/l oxalic acid. Contacting then takes place, with stirring, of one volume of said aqueous solution and one volume of the organic solvent, at 25° C. and for 20 min. The two phases are then separated and determination takes place of the distribution coefficients $D_{Am}$ and $D_{Fe}$ of the americium and iron. The results obtained and the iron and oxalic acid concentrations of the aqueous starting solutions are given in table 3.

It is clear that for iron concentrations between 0.1 and 0.2 mole/l, it is sufficient to add 0.213 or 0.5 mole/l of oxalic acid for separating the iron from the americium.

EXAMPLES 16 TO 21

These examples use compound 5 at a concentration of 0.5 mole/l in t-butyl benzene for separating the zirconium traces present in nitric aqueous solutions and having nitric acid concentrations between 1 and 3 mole/l and to which is or is not added 0.1 mole/l of oxalic acid.

In this case, contacting occurs between one volume of organic solvent and one volume of aqueous solution at 25° C. and for 10 min, followed by the separation of the two phases and the determination of the americium and zirconium distribution coefficients.

The results obtained are given in table 4. These results show that it is sufficient to add 0.1 mole/l of oxalic acid to prevent the extraction of zirconium in the organic solvent when the starting nitric solution is 2 or 3N.

EXAMPLES 22 TO 29

These examples use compound 4 with a concentration of 0.5 mole/l in t-butyl benzene for separating the iron and zirconium from the actinides and lanthanides such as americium, europium and plutonium using the second embodiment of the inventive process. In this case contacting occurs between one volume of an aqueous solution with a nitric acid concentration of 2 or 3 mole/l and containing traces of americium, europium, plutonium, iron and zirconium, after adding to it 0.05 to 0.5 mole/l of oxalic acid and one volume of organic solvent constituted by compound 4 at 0.5 mole/l in t-butyl benzene. After contacting, accompanied by stirring, at 25° C. for 10 min, separation takes place of the two phases and the distribution coefficients of americium, europium, plutonium, iron and zirconium are determined.

The results obtained are given in table 5. These results make it clear that with a nitric acid concentration of 2 or 3 mole/l and the addition of 0.05 to 0.2 mole/l of oxalic acid, it is possible to separate plutonium, americium and europium from iron and zirconium.

EXAMPLES 30 TO 74

These examples also use the second embodiment of the process according to the invention for separating iron and zirconium from actinides and lanthanides, using as the organic solvent compound 4 at a concentration of 0.5 mole/l in t-butyl benzene.

The starting product is constituted by aqueous solutions with nitric acid concentrations from 2 to 4 mole/l, iron concentration of 0.2 to 15 g/l and zirconium concentrations from 0.2 to 1 g/l. To these aqueous solutions is added 0.5 to 1 mole/l of oxalic acid. Extraction takes place by contacting one volume of the aqueous solution and one volume of the organic solvent, accompanied by stirring and at 25° C. for 10 min. The distribution coefficients obtained under these conditions are given in table 6.

These results makes it clear that oxalic acid addition makes it possible to carry out the separation of actinides and/or lanthanides from fission or corrosion products (iron and zirconium). However, when the aqueous solution contains a large amount of iron, it is preferable to add 0.8 to 1 mole/l of oxalic acid and have a nitric acid concentration of 4 mole/l for obtaining a good separation.

The results of examples 12 to 47 are very interesting, because oxalic acid is itself only slightly extractable in the diamides used, as is apparent from table 7. The latter shows the values of the distribution coefficient of oxalic acid $DH_2C_2O_4$ between an organic solvent constituted by compound 4 and a concentration of 0.5 mole/l in tert. butyl benzene and in aqueous solution containing 0.3 mole/l of oxalic acid on contacting, accompanied by stirring and at 25° C. one volume of aqueous solution and one volume of organic solvent. This table makes it clear that the distribution coefficient of oxalic acid is very low, no matter what the nitric acid concentration of the aqueous solution.

EXAMPLES 48, 49, 51, 52, 53

These examples use the third embodiment of the process according to the invention for separating iron from americium by adding to the aqueous solution containing the iron and americium, sodium nitrate or ammonium nitrate in a quantity such that the $NO_3^-$ or $NH_4^+$ concentration exceeds 5M and the $HNO_3$ concentration is equal to or below 0.5M.

To carry out extraction, contacting takes place between one volume of an organic solvent constituted by HTP containing 0.5 mole/l of compound 1 and one volume of the aqueous solution having a nitric acid concentration of 0.01 to 0.5M, containing traces of americium and iron $III^+$, at 25° C. and for 60 min. After separating the phases, determination takes place of the americium and iron concentrations and the distribution coefficients of americium and iron are calculated. The results obtained are given in table 8.

EXAMPLES 50, 54, 55, 56

For these examples the same operating procedure as in the preceding examples is followed for attempting to separate the americium from the iron, but using higher nitric acid concentrations in the aqueous solution without adding sodium nitrate (examples 55 and 56) or the same nitric acid concentration with the addition of lithium nitrate (example 54) and, as hereinbefore, determination takes place of the americium and iron distribution coefficients. The results obtained are given in table 8.

These results show that without the addition of nitrate, it is virtually impossible to separate the iron from the americium and the addition of lithium nitrate does not make it possible to avoid the extraction of the iron and instead facilitates it (example 54). Finally, it can be seen that the iron and americium are only very slightly extracted when the aqueous solution has a low acidity, as in the case of example 50.

In addition, to avoid the extraction of iron by the organic solvent, it is preferable to use a nitric solution with a low nitric acid concentration ($\leqq 0.1$ mole/l) and to add to it sodium nitrate at a concentration of at least 6M.

EXAMPLES 57 TO 68

These examples test the influence of the diluent on the distribution coefficients of americium between a nitric aqueous solution and an organic solvent incorporating as the extractant 2-tetradecyl-N,N'-dimethyl-N,N'-dibuty-propane diamide (compound 1).

In these examples contacting takes place at 25° C. and for 10 min of one volume of a nitric aqueous solution containing americium traces and one volume of an organic solvent containing as the extractant compound 1 and using various diluents. After separation of the aqueous and organic phases, the americium distribution coefficients between the two phases are determined.

The results obtained and the nature of the diluent used, the compound 1 concentrations of the organic solvent and the nitric acid concentration of the aqueous solution are given in table 9.

These results make it clear that all the diluents used make it possible to obtain interesting americium distribution coefficients. However, the distribution coefficients are low when using tetrachloroethylene as the diluent, but it is possible to improve them by modifying the extractant concentration or the organic phase/aqueous phase volume ratio.

EXAMPLES 69 TO 83

In these examples determination takes place of the appearance of a third phase during extraction in the case of an organic solvent using as the diluent HTP and containing 0.5 mole/l of an extractant constituted by a propane diamide according to the invention. In these examples, contacting takes place at 25° C. and for 10 min. of one volume of organic solvent and one volume of a nitric aqueous solution containing $Am^{3+}$ traces and a rising nitric acid concentration is used until a third phase is obtained.

The results obtained are given in table 10. This table makes it clear that the use of HTP as the diluent is possible because the appearance of a third phase with an extractant concentration of 0.5 mole/l corresponds to nitric acidities above 4 mole/l , except in the case of compound 3.

Thus, it is possible to carry out the separation of americium and corrosion products such as iron under good conditions, without adding decanol for delaying the appearance of the third phase, as was recommended in EP-A-210 928.

Therefore the use of the propane diamides according to the invention is very interesting.

TABLE 1

| Compound | Formula |
|---|---|
| no°1 | $CH_3$\N—CO—CH—CO—N/$CH_3$ ; $C_4H_9$/ , $C_{14}H_{29}$ , \$C_4H_9$ |

TABLE 1-continued

| Compound | Formula |
|---|---|
| no°2 | $CH_3$\N—CO—CH—CO—N/$CH_3$ ; $C_4H_9$/ , $C_2H_4$—O—$C_{12}H_{25}$ , \$C_4H_9$ |
| no°3 | $CH_3$\N—CO—CH—CO—N/$CH_3$ ; $C_4H_9$/ , $C_{12}H_{25}$ , \$C_4H_9$ |
| no°4 | $CH_3$\N—CO—CH—CO—N/$CH_3$ ; $C_4H_9$/ , $C_2H_4$—O—$C_6H_{13}$ , \$C_4H_9$ |
| no°5 | $CH_3$\N—CO—CH—CO—N/$CH_3$ ; $C_4H_9$/ , $C_2H_4$—O—$C_2H_4$—O—$C_6H_{13}$ , \$C_4H_9$ |
| no°6 | $CH_3$\N—CO—CH—CO—N/$CH_3$ ; $CH_3$/ , $C_{16}H_{33}$ , \$CH_3$ |

TABLE 2

| Ex. | Compound n°1 mole·l$^{-1}$ | $HNO_3$ mole·l$^{-1}$ | Coefficients | Contact Times (in min) | | | | | | | | | | |
|---|---|---|---|---|---|---|---|---|---|---|---|---|---|---|
| | | | | 0.25 | 0.5 | 1 | 2 | 3 | 5 | 10 | 20 | 30 | 40 | 50 | 60 |
| 7 | 0.5 | 2.5 | $D_{Am}$ | 1.7 | 2.0 | 2.2 | 2.2 | 2.2 | 2.0 | 1.7 | 1.6 | | | | |
| | | | $D_{Fe}$ | 3.9·10$^{-2}$ | 7.5·10$^{-2}$ | 0.16 | 0.26 | 0.34 | 0.47 | 0.52 | 0.49 | | | | |
| | | | FD | 22 | 27 | 14 | 8.6 | 6.5 | 4.4 | 3.2 | 3.2 | | | | |
| 8 | 0.5 | 4 | $D_{Am}$ | 7.5 | 9.4 | 8.8 | 7.1 | 6.8 | 7.6 | 6.1 | 7.0 | 6.8 | 6.8 | | |
| | | | $D_{Fe}$ | 7.5·10$^{-2}$ | 0.14 | 0.29 | 0.54 | 0.94 | 2.4 | 6.1 | 14.9 | 18.2 | 18.2 | | |
| | | | FD | 100 | 67 | 30 | 13 | 7.2 | 3.2 | 1.0 | 0.47 | 0.37 | 0.37 | | |
| 9 | 0.767 | 3 | $D_{Am}$ | 7.8 | 7.9 | 8.0 | 7.7 | 7.9 | 8.0 | 7.6 | 7.5 | 7.0 | 7.1 | 6.9 | 6.3 |
| | | | $D_{Fe}$ | 7.7·10$^{-2}$ | 0.13 | 0.18 | 0.27 | 0.37 | 0.55 | 1.1 | 2.1 | 3.0 | 3.9 | 4.6 | 4.4 |
| | | | FD | 101 | 61 | 44 | 28 | 21 | 14 | 7.0 | 3.6 | 2.3 | 1.8 | 1.5 | 1.4 |

TABLE 3

| Ex. | [$H_2C_2O_4$] mole/l | [$Fe^{3+}$] mole/l | $D_{Am}$ | $D_{Fe}$ |
|---|---|---|---|---|
| 12 | 0.213 | 0.05 | 0.93 | 0.04 |
| 13 | 0.213 | 0.1 | 1.06 | 0.09 |
| 14 | 0.213 | 0.2 | 1.05 | 0.23 |
| 15 | 0.5 | 0.2 | 1.2 | 0.12 |

TABLE 4

| Ex. | [$HNO_3$] mole/l | [$H_2C_2O_4$] mole/l | $D_{Zr(IV)}$ |
|---|---|---|---|
| 16 | 1 | 0 | 0.092 |
| 17 | 1 | 0.1 | 0.02 |
| 18 | 2 | 0 | 7.86 |
| 19 | 2 | 0.1 | 0.12 |
| 20 | 3 | 0 | 170.2 |

TABLE 4-continued

| Ex. | [HNO$_3$] mole/l | [H$_2$C$_2$O$_4$] mole/l | D$_{Zr(IV)}$ |
|---|---|---|---|
| 21 | 3 | 0.1 | 1.46 |

TABLE 5

| Ex. | HNO$_3$ mole/l | (H$_2$C$_2$O$_4$) mole/l | D$_{Am}$ | D$_{Eu}$ | D$_{Pu}$ | D$_{Fe}$ | D$_{Zr}$ |
|---|---|---|---|---|---|---|---|
| 22 | 2 | 0.05 | 0.275 | 0.127 | 1.44 | 0.003 | 0.004 |
| 23 |   | 0.1 | 0.205 | 0.098 | 0.405 | 0.003 | 0.004 |
| 24 |   | 0.2 | 0.185 | 0.088 | 0.167 | 0.002 | 0.006 |
| 25 |   | 0.5 | 0.151 | 0.073 | 0.136 | 0.0005 | 0.002 |
| 26 | 3 | 0.05 | 1.306 | 0.652 | 13.33 | 0.136 | 0.024 |
| 27 |   | 0.1 | 1.17 | 0.586 | 5.29 | 0.0619 | 0.014 |
| 28 |   | 0.2 | 1.12 | 0.562 | 5.08 | 0.033 | 0.008 |
| 29 |   | 0.5 | 0.962 | 0.484 | 1.04 | 0.0114 | 0.0047 |

TABLE 6

| Ex. | HNO$_3$ mole/l | [H$_2$C$_2$O$_4$] mole/l | [Fe] g/l | [Zr] g/l | D$_{Am}$ | D$_{Eu}$ | D$_{Pu}$ | D$_{Fe}$ | D$_{Zr}$ |
|---|---|---|---|---|---|---|---|---|---|
| 30 | 2 | 0.5 | 0.2 | 0.2 | 0.172 | 0.085 | 0.06 | 0.001 | 0.002 |
| 31 |   |   | 0.6 | 0.6 | 0.112 | 0.062 | 0.111 | 0.001 | 0.0016 |
| 32 |   |   | 1 | 1 | 0.100 | 0.057 | 0.121 | 0.0012 | 0.0069 |
| 33 | 3 | 0.5 | 0.2 | 0.2 | 0.642 | 0.350 | 1.161 | 0.011 | 0.0165 |
| 34 |   |   | 0.6 | 0.6 | 0.658 | 0.347 | 1.448 | 0.012 | 0.0005 |
| 35 |   |   | 1 | 1 | 0.726 | 0.398 | 1.638 | 0.0189 | 0.0032 |
| 36 | 4 | 0.5 | 0.2 | 0.2 | 2.291 | 1.237 | 7.51 | 0.1711 | 0.0015 |
| 37 |   |   | 0.6 | 0.6 | 2.023 | 1.146 | 6.48 | 0.170 | 0.0134 |
| 38 |   |   | 1 | 1 | 1.702 | 0.962 | 7.08 | 0.206 | 0.009 |
| 39 | 3 | 0.5 | 2 | 1 | 0.617 | 0.353 | 4.46 | 0.0197 | 0.010 |
| 40 |   | 0.5 | 15 | 1 | 0.734 | 0.419 | 7.23 | 0.0396 | 0.0013 |
| 41 |   | 0.5 | 10 | 1 | 0.722 | 0.421 | 7.63 | 0.094 | 0.0002 |
| 42 |   | 0.5 | 12 | 1 | 0.767 | 0.452 | 11.15 | 0.128 | 0.0002 |
| 43 |   | 0.7 | 12 | 1 | 0.653 | 0.398 | 11.204 | 0.067 | 0.005 |
| 44 |   | 0.7 | 15 | 1 | 0.646 | 0.392 | 9.69 | 0.097 | 0.0003 |
| 45 |   | 0.8 | 15 | 1 | 0.630 | 0.393 | 11.67 | 0.0851 | 0.0002 |
| 46 | 4 | 0.8 | 15 | 1 | 2.97 | 1.87 | 7.81 | 0.225 | 0.0002 |
| 47 |   | 1 | 15 | 1 | 2.87 | 1.87 | 5.67 | 0.204 | 0.002 |

TABLE 7

| (HNO$_3$) mole/l | D$_{H_2C_2O_4}$ |
|---|---|
| 0.05 | 0.08 |
| 0.1 | 0.14 |
| 1 | 0.04 |
| 6 | 0.06 |

TABLE 8

| Ex | 48 | 49 | 50 | 51 | 52 | 53 | 54 | 55 | 56 |
|---|---|---|---|---|---|---|---|---|---|
| HNO$_3$ mole/l | 0.01 | 0.1 | 0.1 | 0.5 | 0.5 | 0.5 | 0.5 | 2.5 | 4.5 |
| NO$_3^-$ mole/l | 6 | 6 | 0 | 6 | 5 | 5 | 5 | 0 | 0 |
| nitrate | NaNO$_3$ | NaNO$_3$ |   | NaNO$_3$ | NaNO$_3$ | NH$_4$NO$_3$ | LiNO$_3$ |   |   |
| Compound n° 1 mole/l | 0.5 | 0.5 | 0.487 | 0.5 | 0.5 | 0.5 | 0.5 | 0.5 | 0.5 |
| D$_{Am}$ | 0.92 | 2.3 | 2 × 10$^{-2}$ | 7.5 | 4.7 | 0.8 | 42 | 0.99 | 7.2 |
| D$_{Fe}$ | 0.18 | 0.46 | 5 × 10$^{-3}$ | 4.6 | 2.1 | 0.15 | 70 | 0.29 | >10 |
| F.S. D$_{Am}$/D$_{Fe}$ | 5 | 5 | 4 | 1.6 | 2.2 | 5.33 | 0.6 |   |   |

TABLE 9

| Ex. | Diluent | Compound n° 1 concentration (mole/l) | HNO$_3$ concentration (mole/l) | D$_{Am}$ |
|---|---|---|---|---|
| 57 | tetra-chlorethylene | 0.487 | 3 | 0.28 |
| 58 | tetra-chlorethylene | 0.487 | 4 | 0.81 |
| 59 | tetra-chlorethylene | 0.487 | 5 | 1.5 |
| 60 | tetra-chlorethylene | 0.487 | 6 | 1.2 |
| 61 | decalin | 0.487 | 3 | 0.81 |
| 62 | decalin | 0.487 | 4 | 2.2 |
| 63 | decalin | 0.487 | 5 | 3.5 |
| 64 | decalin | 0.487 | 6 | 2.9 |
| 65 | HTP (hydrogenated tetrapropylene) | 0.5 | 2 | 0.61 |
| 66 | HTP (hydrogenated tetrapropylene) | 0.5 | 3 | 3.28 |
| 67 | HTP (hydrogenated tetrapropylene) | 0.5 | 4 | 5.65 |
| 68 | HTP (hydrogenated tetrapropylene) | 0.5 | 4.5 | 7.2 |

TABLE 10

| Example | Extractant | HNO$_3$ concentration (mole/l) | D$_{Am}$ |
|---|---|---|---|
| 69 | Compound n°2 | 2 | 2.0 |
| 70 |   | 2.5 | 4.1 |
| 71 |   | 3 | 7.1 |
| 72 |   | 4 | 13.0 |
| 73 |   | 4.5 | 17.7 |
| 74 |   | 4.8 | 3rd phase |
| 75 | Compound n°3 | 2 | 0.7 |
| 76 |   | 3 | 3.44 |

TABLE 10-continued

| Example | Extractant | HNO₃ concentration (mole/l) | $D_{Am}$ |
|---------|------------|------------------------------|----------|
| 77 | | 3.5 | 3rd phase |
| 78 | Compound n°1 | 2 | 0.61 |
| 79 | | 2.5 | 1.7 |
| 80 | | 3 | 3.28 |
| 81 | | 4 | 5.65 |
| 82 | | 4.5 | 7.2 |
| 83 | | 4.7 | 3rd phase |

We claim:

1. Process for separating iron from trivalent lanthanides and/or actinides present in an aqueous acid solution, comprising the steps of:

a) contacting the aqueous acid solution with an organic solvent containing as the extractant a propane diamide of formula:

$$\begin{array}{c} R^1 \\ \diagdown \\ R^2 \end{array} N-CO-CH-CO-N \begin{array}{c} R^1 \\ \diagup \\ R^2 \end{array} \quad (I)$$
$$\phantom{xxxxxxxxxx} R^3$$

in which $R^1$ and $R^2$, which can be the same or different, represent a straight or branched alkyl radical with 1 to 25 carbon atoms or a radical of formula:

$$-(CH_2)_n-Z-(CH_2)_m-O-R^4$$

in which $R^4$ is an alkyl radical with 1 to 13 carbon atoms, n is equal to 0 or an integer from 1 to 6, Z is a single bond or an oxygen atom and m is an integer from 1 to 6, provided that Z is a single bond when n is equal to 0, and $R^3$ represents an alkyl radical with 12 to 25 carbon atoms, for between 15 seconds and 5 minutes and b) separating the organic solvent having extracted the actinides and/or lanthanides from the aqueous solution containing the iron.

2. Process according to claim 1, wherein the aqueous acid solution is a nitric solution with a nitric acid concentration of 2 to 5 mole/l.

3. Process according to claim 1, wherein the propane diamide concentration of the organic solvent is 0.1 to 2 mole/l.

4. Process according to claim 1, wherein the propane diamide complies with the formula:

$$\begin{array}{c} CH_3 \\ \diagdown \\ C_4H_9 \end{array} N-CO-CH-CO-N \begin{array}{c} CH_3 \\ \diagup \\ C_4H_9 \end{array}$$
$$\phantom{xxxxxxxxxx} C_{14}H_{29}$$

5. Process according to claim 1, wherein the propane diamide complies with the formula:

$$\begin{array}{c} CH_3 \\ \diagdown \\ CH_3 \end{array} N-CO-CH-CO-N \begin{array}{c} CH_3 \\ \diagup \\ CH_3 \end{array}$$
$$\phantom{xxxxxxxxxx} C_{16}H_{33}$$

6. Process for separating iron and/or zirconium from trivalent lanthanides and/or actinides present in an aqueous acid solution, comprising the steps of:

a) adding oxalic acid to the aqueous solution, b) contacting the aqueous acid solution containing the oxalic acid with an organic solvent containing as the extractant a propane diamide of formula:

$$\begin{array}{c} R^1 \\ \diagdown \\ R^2 \end{array} N-CO-CH-CO-N \begin{array}{c} R^1 \\ \diagup \\ R^2 \end{array}$$
$$\phantom{xxxxxxxxxx} R^3$$

in which $R^1$ and $R^2$, which can be the same or different, represent a straight or branched alkyl radical with 1 to 25 carbon atoms, or a radical of formula:

$$-(CH_2)_n-Z-(CH_2)_m-O-R^4$$

in which $R^4$ is an alkyl radical with 1 to 13 carbon atoms, n is equal to 0 or is an integer from 1 to 6, Z is a single bond or a hydrogen atom and m is an integer from 1 to 6, provided that Z is a single bond when n is equal to 0 and $R^3$ represents an alkyl radical with 12 to 25 carbon atoms, or a radical of formula:

$$-(CH_2)_n-Z-(CH_2)_m-O-R^4$$

in which n, m, Z and $R^4$ have the meanings given hereinbefore, and c) separating the organic solvent which extracted the actinides and/or lanthanides from the aqueous solution containing the iron and/or zirconium.

7. Process according to claim 6, wherein the oxalic quantity added to the aqueous acid solution is 0.05 to 0.5 mole/l.

8. Process according to claim 6, wherein the aqueous acid solution is a nitric solution with a nitric acid concentration of 2 to 4 mole/l.

9. Process for separating iron from trivalent lanthanides and/or actinides present in an aqueous acid solution, comprising the steps of:

a) adding to the aqueous acid solution a nitrate of formula (NO₃)vM, in which M is NH₄ or a metal, except Li and v is the valency of said metal, b) contacting the thus treated aqueous acid solution with an organic solvent containing as the extractant a propane diamide of formula:

$$\begin{array}{c} R^1 \\ \diagdown \\ R^2 \end{array} N-CO-CH-CO-N \begin{array}{c} R^1 \\ \diagup \\ R^2 \end{array}$$
$$\phantom{xxxxxxxxxx} R^3$$

in which $R^1$ and $R^2$, which can be the same or different, represent a straight or branched alkyl radical with 1 to 25 carbon atoms or a radical of formula:

$$-(CH_2)_n-Z-(CH_2)_m-O-R^4$$

in which $R^4$ is an alkyl radical with 1 to 13 carbon atoms, n is equal to 0 or an integer from 1 to 6, Z is a single bond or an oxygen atom and m is an integer from 1 to 6, provided that Z is a single bond when n is equal to 0, and $R^3$ represents an alkyl radical having 12 to 25 carbon atoms, or a radical of formula:

$$-(CH_2)_n-Z-(CH_2)_m-O-R^4$$

in which n, m, Z and $R^4$ have the meanings given hereinbefore, and c) separating the organic solvent which has extracted the actinides and/or lanthanides from the aqueous solution containing the iron.

10. Process according to claim 9, wherein the quantity of nitrate $(NO_3)vM$ added is such that the $NO_3^-$ concentration of the aqueous solution is at least 6 mole/l.

11. Process according to claim 10, wherein the aqueous acid solution is a nitric solution with a nitric acid concentration below 0.1 mole/l.

12. Process according to claim 9, wherein the propane diamide complies with the formula:

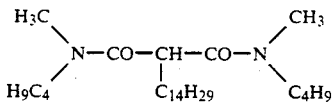

13. Process according to claim 1, wherein the organic solvent comprises a diluent chosen from among the group consisting of benzene, xylene, mesitylene, tert. butyl benzene, dodecane, hydrogenated tetrapropylene, decalin and tetrachloroethylene.

14. Process according to claim 6, wherein the organic solvent comprises a diluent chosen from among the group consisting of benzene, xylene, mesitylene, tert. butyl benzene, dodecane, hydrogenated tetrapropylene, decalin and tetrachloroethylene.

15. Process according to claim 9, wherein the organic solvent comprises a diluent chosen from among the group consisting of benzene, xylene, mesitylene, tert. butyl benzene, dodecane, hydrogenated tetrapropylene, decalin and tetrachloroethylene.

* * * * *